3,684,542
PIGMENT PREPARATIONS TO BE USED IN NON-AQUEOUS SYSTEMS AND PROCESS FOR THEIR MANUFACTURE
Hartmut Gossel, Kriftel, Taunus, Kurt Merkle, Kelkheim, Taunus, Ferdinand Memmel, Frankfurt am Main, and Erwin Janousch, Camberg, Taunus, Germany, assignors to Farbwerke Hoechst Aktiengesellschaft vormals Meister Lucius & Bruning, Frankfurt am Main, Germany
No Drawing. Continuation-in-part of application Ser. No. 756,388, Aug. 30, 1968. This application Dec. 9, 1970, Ser. No. 96,603
Claims priority, application Germany, Sept. 4, 1967, F 53,397
Int. Cl. C08h 17/04
U.S. Cl. 106—308 Q  3 Claims

ABSTRACT OF THE DISCLOSURE

Pigment dispersions consisting of a finely distributed inorganc pigment dyestuff in a dispersing medium suitable for being used in non-aqueous systems, wherein the dispersing medium consists of compounds of the general formula

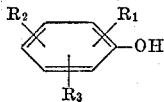

wherein $R_1$ represents an alkyl radical with 4 to 18 carbon atoms, and $R_2$ and $R_3$ are hydrogen atoms or alkyl groups containing from 1 to 18 carbon atoms, the alkyl groups being straight-chained or branched, or a mixture thereof, and a process for their manufacture.

---

This application is a continuation-in-part of our application Ser. No. 756,388 filed Aug. 30, 1968, now Pat. No. 3,620,793.

The pigmentation of non-aqueous systems, for instance, lacquers, plastics and cellular plastics is generally carried out by triturating the dry pigment powder in a three roller mill with a pair or a component of the medium to be coloured and subsequently distributing the pigment paste formed in the application medium. By treatment in a three roller mill the agglomerates formed by cohesion of the pigment powders during the production and the drying of the dyestuffs are destroyed to a large extent. By this measure a considerable increase in tinctorial strength is attained when the pigments are applied. The dispersing medium serves to facilitate the destruction of the pigment agglomerates and to stabilize the high fine-distribution of the pigment, i.e., to inhibit a reagglomeration of the pigment particles in the preparations.

Pastes obtained under the above-mentioned conditions still show, however, essential disadvantages which adversely influence their use in industrial practice. For instance, the dispersing medium used in these cases is not broadly compatible with other media applied, i.e., the possibility of pigmenting with said paste systems based on a heterogeneous substance is very small. Moreover, the pastes are often not storable for a sufficient long period since the dispersing medium used favours the recrystallization or reagglomeration of the pigment, thus causing losses in tinctorial strength. Finally, the pigment mostly develops its full tinctorial strength in the dispersing medium applied only with application of high shearing stress.

Therefore, a high interest existed to obtain a pigment preparation containing a dispersing medium not exhibiting the drawbacks described. It is, for instance, already known that reaction products of alkylphenols, long-chain fatty alcohols or fatty acids with ethylene-oxide show favorable dispersing properties due to the presence of the polar polyglycol ether chain, and that when these compounds are used as dispersing media for organic pigments preparations can be obtained which are suitable for the pigmentation of several non-aqueous systems (British patent specification 841,519).

Now we have surprisingly found that mononuclear alkylphenols of the general Formula 1

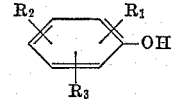

wherein $R_1$ represents an alkyl radical with 4 to 18 carbon atoms, preferably 8–12 carbon atoms, and $R_2$ and $R_3$ are hydrogen atoms or alkyl groups containing from 1 to 18 carbon atoms, preferably hydrogen atoms or alkyl groups of from 8 to 12 carbon atoms, and wherein the alkyl groups may be straight-chained or branched, are not only excellent dispersing agents for organic and inorganic pigments but that they also show considerable advantages in comparison with the ethoxylated products mentioned above. Mixtures of the alkylphenols concerned can likewise be used. For the application as dispersing medium the alkylphenols may contain slight amounts of unreacted starting products, for instance phenol, originating from the alkylation reaction for the production of these compounds. As an example for an especially suitable alkylphenol there may be named nonylphenol.

The present invention thus provides pigment preparations, preferably pigment pastes, of a finely divided pigment dyestuff—in this continuation-in-part of our application Ser. No. 756,388 especially inorganic pigments—in a dispersing medium, suitable to be used in non-aqueous systems, and characterized in that the dispersing medium consists of mononuclear alkylphenols of the general Formula 1 or of mixtures thereof.

For the pigment preparations according to this part of the invention, there are used the known inorganic pigment dyestuffs, for example

| 1 | C.I. group | C.I. No. |
|---|---|---|
| Molybdate Red | Pigment Red 104 | 77605 |
| Cadmium Yellow | Pigment Yellow 37 | 77199 |
| Cadmium Red | Pigment Red 108 | 77196 |
| Chrome Yellow | Pigment Yellow 34 | 77600 |
| Chrome Oxide Green | Pigment Green 17 | 77288 |
| Iron Oxide Red | Pigment Red 101 | 77491 |
| Iron Oxide Black | Pigment Black 11 | 77499 |
| Ultramarine Blue | Pigment Blue 29 | 77007 |
| Cobalt Blue | Pigment Blue 28 | 77346 |
| Titanium Nickel Yellow | Pigment Yellow 53 | 77788 |
| Titanium Dioxide | Pigment White 6 | 77891 |
| Carbon Black | Pigment Black 7 | 77266 |

The pigment preparations are produced by simply working the pigments into the dispersing medium. When operating in this way, usual apparatuses, for instance planetary mixers, mixing devices, dissolvers, saw-tooth stirrers, ball-, pearl- or sand mills, kneading devices and three roller mills may be used. Generally, one starts from the dry pigment powders; they are suitably mixed at first in the dispersing medium and then homogeneously distributed to the desired extent with the aid of a dispersing device. The operating temperature for the production of the preparations depends upon the pigment and the carrier substance used. It generally amounts to room temperature; in special cases elevated temperatures may be applied which should, however, not exceed 100° C.

In the pigment preparations according to the invention, the ratio between dispersing medium and pigment may vary within wide limits. This ratio depends, above all, upon the nature of the pigment to be prepared, the required consistency of the pastes and the intended use of the preparations. Generally, the pigment content of the preparations is maintained within a range of from about 10 to 80 percent by weight. An essentail characteristic of the pigment preparations according to the invention consists in the fact that, with a view to their being used in non-aqueous mediums, they may be dosed easily and combined with each other without difficulties.

The use of alkylphenols of the general Formula 1, especially of nonylphenol, or of mixtures of said alkylphenols, as dispersing medium for the pigment preparations according to the invention shows a number of essential advantages in comparison with the corresponding ethoxylated products:

It is found, for instance, that the pigment content of the preparations manufactured in the above-mentioned way, in the flowing state in which they can easily be treated unobjectionably—depending on the pigment used— is higher up to 20% by weight. Thereby, the portion of substance heterogeneous to the systems (dispersing medium) which is drawn during pigmentation into the medium applied is correspondingly lower.

A further advantage of the pigment preparations produced according to the process of the present invention can be seen in the fact that the latter, in addition to the pigmentation of polyether and polyester cellular plastics, unsaturated polyester resins, PVC spreading pastes and other hydrophobic systems, can also be used for shading stoving lacquers. In this connection it is advantageously observed that the alkylphenols—especially nonylphenol— show the property of escaping from the lacquer layer during the stoving procedure. Thus, a diminution of hardness and weather resistance of the lacquer layers is avoided even though they contain a higher amount of paste (stronger pigmentation).

Finally, the preparations produced by means of these alkylphenols are not hygroscopic. This shows a a favorable effect insofar as the presence of small amounts of water may cause disturbances as regards the compatibility of the dispersing medium when worked into non-aqueous systems.

As further favorable features, particularly when nonylphenol is used as dispersing medium, there is mentioned that a sufficient degree of dispersion is attained with many pigments with the aid of a planetary or a saw tooth stirrer. For dispersing pigments very hard in grain on the three roller mill, a single passage of the pasty pigment in this apparatus is in most cases sufficient to attain the fine size of grain of $<5\mu$, whereas with the known methods several passages are necessary. Furthermore, due to the low vapor pressure at room temperature all difficulties occurring with the use of easily volatile, combustible solvents for the manufacture of pigment preparations do not exist. No tendency of the pigment to lose tinctorial strength in the dispersing medium by storage is observed.

The dispersing medium of the above-mentioned alkylphenols or mixtures thereof can be diluted, if necessary, with a softener, an inert organic solvent, a solution of a resin in such a solvent or likewise with a liquid resin. This may be desirable, for example, if the pigment preparation is to be incorporated into a system in which the presence of large proportions of the dispersing medium are inconvenient.

The following examples illustrate the invention, but they are not intended to limit it thereto. The indications in percent are percent by weight.

EXAMPLE 1

550 grams of a dry powder of Iron Oxide Red $Fe_2O_3$ (C. I. Pigment Red 101, Colour Index No. 77491) are mixed with 310 grams of industrial nonylphenol contaminated mainly by di-nonylphenol (about 15–20%) and this mixture is stirred for 2 hours with a planetary stirrer. After addition of a further 90 grams of industrial nonylphenol a flowable paste is obtained, the pigment content of which amounts to 58%, calculated on the total weight of the preparation.

EXAMPLE 2

364 grams of a dry powder of Cadmium Red CdSe (C.I. Pigment Red 108, Colour Index No. 77196) are mixed with 196 grams of purified nonylphenol (free of phenol and dinonylphenol) and this mixture is stirred for 30 minutes with a dissolver (saw-tooth stirrer). After addition of a further 47 grams of purified nonylphenol, a readily flowable paste is obtained, the pigment content of which amounts to 60%, calculated on the total weight of the preparation.

EXAMPLE 3

308 grams of a dry powder of Cadmium Yellow CdS (C.I. Pigment Yellow 37, Colour Index No. 77199) are mixed with 252 grams of purified nonylphenol and this mixture is stirred for 30 minutes with a dissolver. After addition of a further 43 grams of purified nonylphenol a readily flowable paste is obtained, the pigment content of which amounts to 51%, calculated on the total weight of the preparation.

EXAMPLE 4

520 grams of a dry powder of Chrome Yellow $PbCrO_4$ (C.I. Pigment Yellow 34, Colour Index No. 77600) are mixed with 180 grams of purified nonylphenol and this mixture is stirred for 30 minutes with a dissolver. After addition of a further 65 grams of purified nonylphenol a readily flowable paste is obtained, the pigment content of which amounts to 68%, calculated on the total weight of the preparation.

EXAMPLE 5

100 grams of a dry powder of Carbon Black (C.I. Pigment Black 7, Colour Index No. 77266) are mixed with 400 grams of purified nonylphenol and this mixture is stirred for 60 minutes with a dissolver. After addition of a further 166 grams of purified nonylphenol, a readily flowable paste is obtained, the pigment content of which amounts to 15%, calculated on the total weight of the preparation.

EXAMPLE 6

392 grams of a dry powder of titanium dioxide $TiO_2$ (C.I. Pigment White 6, Colour Index No. 77891) are mixed with 168 grams of purified nonylphenol and this mixture is stirred for 30 minutes with a saw-tooth stirrer. After addition of a further 43 grams of purified nonylphenol a readily flowable paste is obtained, the pigment content of which amounts to 65%, calculated on the total weight of the preparation.

EXAMPLE 7

315 grams of a dry powder of Ultramarine Blue (C.I. Pigment Blue 29, Colour Index No. 77007) which pigment has a relatively hard grain, are mixed with 355 grams of purified nonylphenol and this mixture is stirred for 1 hour with a saw-tooth stirrer. A readily flowable paste is obtained, the pigment content of which amounts to 47%, calculated on the total weight of the preparation.

The grindometer value of such a paste (measured by means of a Hegmann grindometer) is $60\mu$, which value decreases to below $5\mu$ after a single passage on a three roller mill. (Size of grain required in lacquer manufacture.)

EXAMPLE 8

448 grams of a dry powder of Titanium Nickel Yellow (C.I. Pigment Yellow 53, Colour Index No. 77788) are mixed with 112 grams of purified nonylphenol and this mixture is stirred for 1 hour with a saw-tooth stirrer. After addition of a further 37 grams of purified nonylphenol, a readily flowable paste is obtained, the pigment content of which amounts to 75%, calculated on the total weight of the preparation.

EXAMPLE 9

398 grams of a dry powder of Cobalt Blue (C.I. Pigment Blue 28, Colour Index No. 77346) are mixed with 162 grams of purified nonylphenol and this mixture is stirred for 1 hour with a saw-tooth stirrer. After addition of a further 42 grams of purified nonylphenol, a readily flowable paste is obtained, the pigment content of which amounts to 66%, calculated on the total weight of the preparation.

EXAMPLE 10

375 grams of a dry powder of Chrome Oxide Green (C.I. Pigment Green 17, Colour Index No. 77288) are mixed with 185 grams of purified nonylphenol and this mixture is stirred for 1 hour with a saw-tooth stirrer. After addition of a further 45 grams of purified nonylphenol, a readily flowable paste is obtained, the pigment content of which amounts to 62%, calculated on the total weight of the preparation.

EXAMPLE 11

398 grams of a dry powder of Iron Oxide Black (C.I. Pigment Black 11, Colour Index No. 77499) are mixed with 162 grams of purified nonylphenol and this mixture is stirred for 1 hour with a saw-tooth stirrer. A readily flowable paste is obtained, the pigment content of which amounts to 71%, calculated on the total weight of the preparation.

EXAMPLE 12

291 grams of a dry powder of Iron Oxide Red (C.I. Pigment Red 101, Colour Index No. 77491) are mixed with 269 grams of industrial octylphenol and this mixture is stirred for 1 hour with a saw-tooth stirrer. After addition of a further 47 grams of industrial octylphenol, a readily flowable paste is obtained, the pigment content of which amounts to 48%, calculated on the total weight of the preparation.

We claim:

1. A fluid to pasty pigment preparation consisting of a finely distributed inorganic pigment dyestuff in a dispersing medium suitable for being used as a coloring means in non-aqueous systems, which comprises as the dispersing medium a compound of the formula

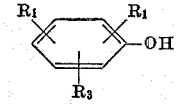

wherein $R_1$ is an alkyl group of 8 to 12 carbon atoms, and $R_2$ and $R_3$ each is a hydrogen atom or an alkyl group of 8 to 12 carbon atoms, said alkyl groups being straight-chained or branched, or a mixture thereof.

2. A pigment preparation according to claim 1 wherein said dispersing medium is industrial nonylphenol.

3. A pigment preparation according to claim 1 containing about 10% to about 80% by weight of pigment.

References Cited

UNITED STATES PATENTS 3,211,569  10/1965  Patton _____ 106—308

TOBIAS E. LEVOW, Primary Examiner

J. V. HOWARD, Assistant Examiner

U.S. Cl. X.R.

106—300, 302, 304, 305, 307